United States Patent
Soni et al.

(10) Patent No.: US 11,488,028 B2
(45) Date of Patent: Nov. 1, 2022

(54) COLLABORATIVE PERSONALIZATION VIA SIMULTANEOUS EMBEDDING OF USERS AND THEIR PREFERENCES

(71) Applicant: Oath Inc., New York, NY (US)

(72) Inventors: Akshay Soni, San Jose, CA (US); Yashar Mehdad, San Jose, CA (US); Troy Chevalier, San Mateo, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 640 days.

(21) Appl. No.: 15/476,685

(22) Filed: Mar. 31, 2017

(65) Prior Publication Data

US 2018/0285774 A1    Oct. 4, 2018

(51) Int. Cl.
| | |
|---|---|
| *G06N 5/02* | (2006.01) |
| *G06N 20/00* | (2019.01) |
| *G06N 3/08* | (2006.01) |
| *G06Q 50/00* | (2012.01) |
| *G06F 16/951* | (2019.01) |
| *G06F 16/9535* | (2019.01) |

(52) U.S. Cl.
CPC ............. *G06N 5/02* (2013.01); *G06F 16/951* (2019.01); *G06F 16/9535* (2019.01); *G06N 3/084* (2013.01); *G06N 20/00* (2019.01); *G06Q 50/01* (2013.01)

(58) Field of Classification Search
CPC ....... G06N 20/00; G06F 16/951; G06Q 50/01
See application file for complete search history.

(56) References Cited

U.S. PATENT DOCUMENTS

| | | | |
|---|---|---|---|
| 10,033,727 B1* | 7/2018 | Fieldman | H04L 63/08 |
| 2012/0143911 A1* | 6/2012 | Liebald | G06F 16/337 |
| | | | 707/771 |
| 2017/0185666 A1* | 6/2017 | Pasternack | G06F 16/2228 |
| 2017/0193390 A1* | 7/2017 | Weston | G06N 3/08 |
| 2017/0220577 A1* | 8/2017 | Pal | G06Q 50/01 |
| 2017/0251259 A1* | 8/2017 | Klappert | G06F 16/435 |

(Continued)

OTHER PUBLICATIONS

Le, Quoc, and Tomas Mikolov. "Distributed representations of sentences and documents." International conference on machine learning. 2014. (Year: 2014).*

(Continued)

*Primary Examiner* — Michael J Huntley
*Assistant Examiner* — Sehwan Kim
(74) *Attorney, Agent, or Firm* — Cooper Legal Group, LLC

(57) ABSTRACT

A method is provided, including: processing interactions by a plurality of users with a plurality of content items, the content items being provided over a network in response to user requests received over the network, wherein each content item is associated with one or more entities; for each user, determining a user entity set that includes entities associated with content items with which the user interacted; embedding the users and the entities in a vector space, wherein the embedding is configured to place a given user, and the entities of the given user's user entity set, in proximity to each other in the vector space; for each user, performing a proximity search in the vector space to identify a set of nearest entities to the user in the vector space; for each user, generating a user profile using the identified set of nearest entities to the user.

20 Claims, 6 Drawing Sheets

(56) References Cited

U.S. PATENT DOCUMENTS

2018/0060755 A1* 3/2018 Green ................ H04L 67/22
2018/0268317 A1* 9/2018 Dharwadker .......... G06V 20/30

OTHER PUBLICATIONS

Gattani, Abhishek, et al. "Entity extraction, linking, classification, and tagging for social media: a wikipedia-based approach." Proceedings of the VLDB Endowment 6.11 (2013): 1126-1137. (Year: 2013).*

Ha, Inay, Kyeong-Jin Oh, and Geun-Sik Jo. "Personalized advertisement system using social relationship based user modeling." Multimedia Tools and Applications 74.20 (2015): 8801-8819. (Year: 2015).*

* cited by examiner

COLLABORATIVE PERSONALIZATION VIA SIMULTANEOUS EMBEDDING OF USERS AND THEIR PREFERENCES

BACKGROUND

1. Field of the Disclosure

The present disclosure relates to methods and systems for collaborative personalization via simultaneous embedding of users and their preferences.

2. Description of the Related Art

Content personalization systems are used to provide user experiences wherein content is tailored to the users ascertained preferences. Existing personalization systems infer user interests in a user profile. However, a given user's profile tends to become stable over time, meaning that the given user will be shown the same types of content repeatedly, which leads to decreasing user engagement over time. One strategy for addressing this issue is to show the user randomly selected items of content along with their recommended content. However, this approach may show items that the user is not interested in viewing, and therefore degrade the user experience.

It is in this context that implementations of the disclosure arise.

SUMMARY

Implementations of the present disclosure provide methods and systems for collaborative personalization via simultaneous embedding of users and their preferences.

In some implementations, a method implemented by at least one server computer is provided, comprising: processing interactions by a plurality of users with a plurality of content items, the content items being provided over a network in response to user requests received over the network, wherein each content item is associated with one or more entities; for each user, determining a user entity set that includes entities associated with content items with which the user interacted; embedding the users and the entities in a vector space, wherein the embedding is configured to place a given user, and the entities of the given user's user entity set, in proximity to each other in the vector space; for each user, performing a proximity search in the vector space to identify a set of nearest entities to the user in the vector space; for each user, generating a user profile using the identified set of nearest entities to the user.

In some implementations, the embedding is configured to predict a target entity in a given user entity set using context entities in the given user entity set and identification of the associated user of the given user entity set.

In some implementations, the embedding is configured to minimize a loss function.

In some implementations, the loss function includes a component configured to approximate a conditional probability of the target entity based on the context entities and the identification of the associated user of the given user entity set.

In some implementations, performing the proximity search includes performing a k-nearest neighbor search.

In some implementations, the method further comprises: receiving, over the network, a request to access content items by a given user; in response to the request, determining recommended content items based on the given user's user profile, and providing, over the network to the given user, access to the recommended content items.

In some implementations, the request is defined from a web page request, a search query, a social media access request, or a product search.

In some implementations, the content items include one or more of articles, social media posts, videos, images, and audio.

In some implementations, a computer readable medium having program instructions embodied thereon is provided, the program instructions being configured, when executed by a computing device, to cause the computing device to perform the following operations: process interactions by a plurality of users with a plurality of content items, the content items being provided over a network in response to user requests received over the network, wherein each content item is associated with one or more entities; for each user, determine a user entity set that includes entities associated with content items with which the user interacted; embed the users and the entities in a vector space, wherein the embedding is configured to place a given user, and the entities of the given user's user entity set, in proximity to each other in the vector space; for each user, perform a proximity search in the vector space to identify a set of nearest entities to the user in the vector space; for each user, generate a user profile using the identified set of nearest entities to the user.

In some implementations, a server computer is provided, comprising: logic configured to process interactions by a plurality of users with a plurality of content items, the content items being provided over a network in response to user requests received over the network, wherein each content item is associated with one or more entities; logic configured to, for each user, determine a user entity set that includes entities associated with content items with which the user interacted; logic configured to embed the users and the entities in a vector space, wherein the embedding is configured to place a given user, and the entities of the given user's user entity set, in proximity to each other in the vector space; logic configured to, for each user, perform a proximity search in the vector space to identify a set of nearest entities to the user in the vector space; logic configured to, for each user, generate a user profile using the identified set of nearest entities to the user.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
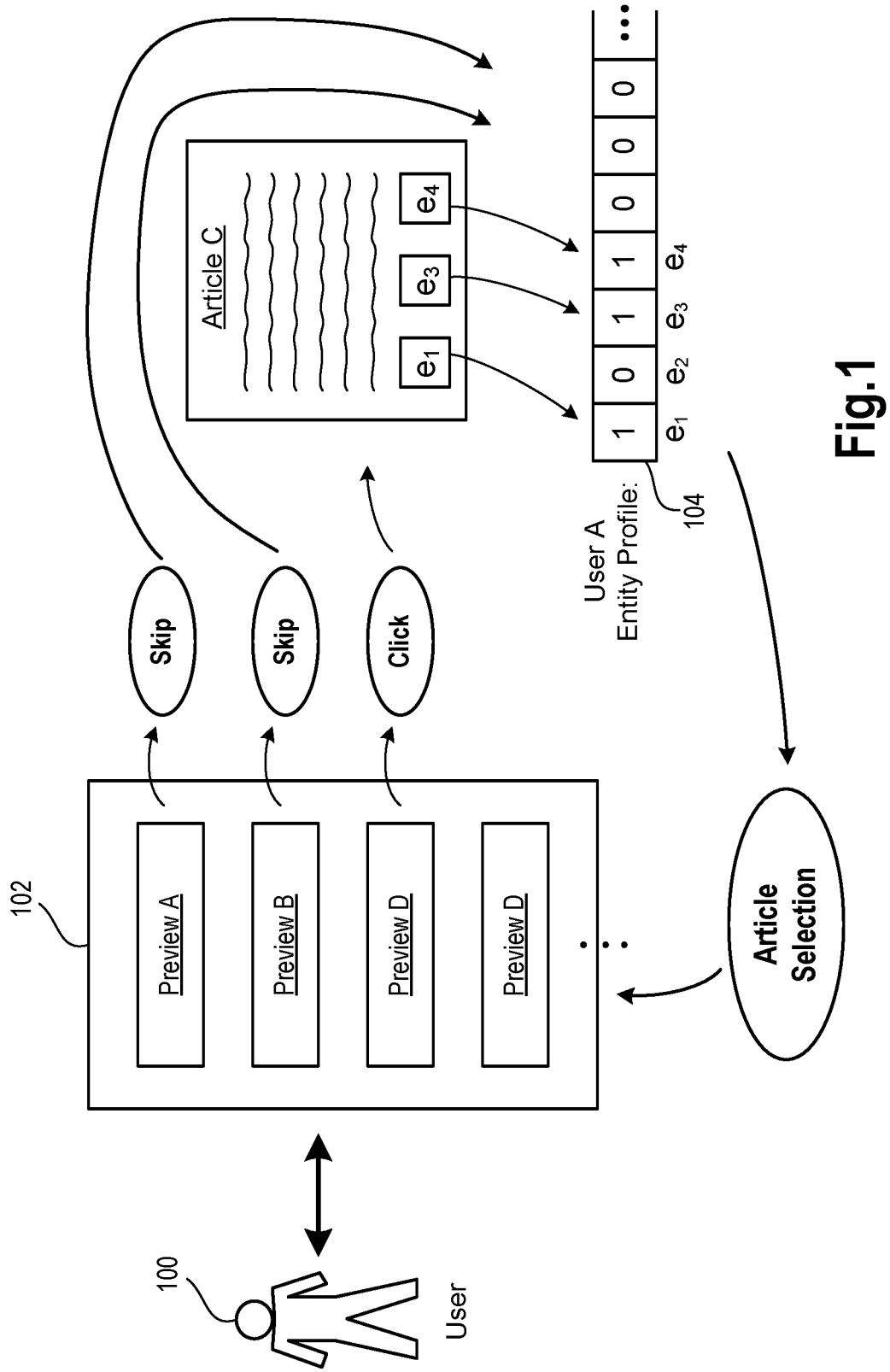
FIG. 1 conceptually illustrates user interaction with content delivered over a network, in accordance with implementations of the disclosure.

The following implementations describe systems and methods for collaborative personalization via simultaneous embedding of users and their preferences. It will be obvious, however, to one skilled in the art, that the present disclosure may be practiced without some or all of these specific details. In other instances, well known process operations have not been described in detail in order not to unnecessarily obscure the present disclosure.

Subject matter will now be described more fully hereinafter with reference to the accompanying drawings, which form a part hereof, and which show, by way of illustration, specific example implementations. Subject matter may, however, be embodied in a variety of different forms and, therefore, covered or claimed subject matter is intended to be construed as not being limited to any example implementations set forth herein; example implementations are provided merely to be illustrative. Likewise, a reasonably broad scope for claimed or covered subject matter is intended. Among other things, for example, subject matter may be embodied as methods, devices, components, or systems. Accordingly, implementations may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one implementation" as used herein does not necessarily refer to the same implementation and the phrase "in another implementation" as used herein does not necessarily refer to a different implementation. It is intended, for example, that claimed subject matter include combinations of example implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Disclosed herein is a novel technique to construct collaborative user interest profiles for personalized recommendation and ranking. The technique entails using not only the historical interaction data of a given user, but also the data from other similar users to construct the user profile. This enables a recommender to serve content to a given user, based on the other users who have similar interests. User profiles are important for any personalized digital content serving platform and a large-scale intuitive solution to the challenge of creating high quality user profiles is sought.

Existing approaches generally use a matrix-factorization framework, which entails learning user and item (things to be recommended) latent factors. The preference of a user for a particular item is then estimated using the inner-product (or some other similarity measure) of the user and item latent factors. However, since these operations occur in a latent space that not only depends on the dimension used, but also on the cost function used for optimization, it is difficult to intuitively think about and understand what is happening.

The presently described approach is more direct than existing methods for constructing user profiles. In implementations of the present disclosure, users and items are embedded in a Euclidean space such that items preferred by a user are located in a close vicinity of the user, and users who share similar preferred items are close to each other. Construction of user interest profiles then directly follows from a k-nearest neighbor search in the neighborhood of the user vector in the embedded space to find items located nearest to him.

Implementations of the disclosure solve the problem of constructing user interest profiles in order to retrieve and recommend interesting digital content for users. The history of user interactions with different items is used to learn user behavior. A good and rich interest profile allows delivery of high quality and relevant content to users, increasing both user engagement and revenue.

Broadly speaking, implementations of the present disclosure model each item as a collection of entities which can be a person, object, city, sport or any other object. For example, an article/document can be associated with multiple entities—for instance, an article may be about entities "US President" and "Barack Obama." By looking at the historical interaction data of users and items, a set of preferred entities for each user is learned. This enables retrieving and recommending documents which consist of the entities in which the user is interested.

By way of example, suppose user_I clicked on item_J which consists of entities $e\_J=[e\_1, e\_2, \ldots, e\_N]$. A training data set can be formed as the collection of users and the set of entities they interacted with. So each data point is of the following form: $[user\_I, e\_J=[e\_1, e\_2, \ldots, e\_N]]$.

During embedding, a state-of-the-art Doc2Vec approach is applied, treating each data point as a document with user id representing the document label and the set of entities representing the words of the document. Embedding will by nature embed similar users together, and also put the entities close to the associated users.

During profile construction, once the embedding is done, the user profile for a particular user can be created by finding out nearest entities in the vector space under the assumption that entities close to the user are either liked by the user or are liked by other similar users. The corresponding value for the entity can be chosen to be cosine similarity.

After learning the user profiles for all users, the profiles are used for retrieval and ranking purposes.

The presently disclosed implementations provide several advantages over existing methods of user profile generation. Implementations of the disclosure enable efficient user profile generation on a large scale. Use of k-nearest neighbor based user profiles yields a profile and generation construct that is easier to understand and interpret than existing latent factor based approaches. Further, the k-nearest neighbor search can be made even faster by using hashing techniques. Because the profile is distance-based in a vector space, the scope or range of the profile can be adjusted. In other words, it is possible to create a profile that is as expansive or as focused as desired, such that as the scope of the profile increases, the expected preference/interest of the user for the additionally included entities will progressively decline. Additionally, implementations of the disclosure enable understanding of very complex relationships between entities and users by looking at the associated geometry in the embedded space.

FIG. 1 conceptually illustrates user interaction with content delivered over a network, in accordance with implementations of the disclosure. In the Illustrated implementation the user 100 interacts with content presented in a context 102. It will be appreciated that in various implementations, the context 102 can be defined by various ways of presenting content over a network, such as the Internet. In some implementations, the context 102 is a webpage presented through a browser application that is executed by a computing device, such as a personal computer, laptop, tablet, cellular phone, mobile device, etc. In other implementations, the context 102 can be defined by other forms or containers for the presentation of content, such as through various applications or apps, a social media stream/feed, etc. The presentation of content in the context 102 is configured to enable the system to determine user interactions, and by extension, user interest, in various types of content. It will be appreciated by those skilled in the art that the content can include any kind of content that may be presented over a network, including, without limitation, articles, documents, pictures, video, audio, etc.

In the Illustrated implementation, a series of article previews are presented for the user 100 to choose from, including a preview A, preview B, preview C, and preview D, which when selected, provide access to corresponding articles A, B, C, and D. By selecting or skipping the article previews, a user indicates their interest or disinterest in entities that are associated with the articles. For example, in the Illustrated implementation, The user 100 has clicked on the article preview C, which causes the full version of the article C to be presented. As shown, the article C is associated with various entities $E_1$, $E_3$, and $E_4$. That is, the article C has been determined to be about these entities, and by clicking on the article preview so as to view the article, the user 100 has thereby indicated interest in these entities. In some user profile systems, this indication of interest on the part of the user 100 can be used as a signal to determine or otherwise affect a feature vector 104 that defines the user's profile. For example, the user's feature vector 104 can include fields that correspond to the various possible entities, with each field having a value/score indicating the user's level of interest in the corresponding entity. In a simplistic example, the fields have binary values indicating interest/disinsterest in corresponding entities, whereas in more sophisticated examples, the fields may have a range of discreet or continuous values.

The user feature vector 104 can be applied to rank and/or select articles for recommendation to the user. For example, articles may have associated entity scores that indicate the extent to which a given article is about a given entity, which can be expressed as an article feature vector. Articles can then be ranked in accordance with how well their article feature vectors match against a given user's feature vector. However, a problem with such systems is that users will tend to receive only content recommendations for content types in which they have already expressed interest. This results in a lack of variety for the user, which can cause reduced user engagement over time.

To address this issue, collaborative personalization and filtering solutions have been sought, in which data from similar users is also used to provide recommendations to a given user. However, existing approaches in this vein rely upon a matrix-factorization framework to learn user and item latent factors. The preference of a user for a particular item is then estimated using the inner-product (or some other similarity measure) of the user and item latent factors. However, since these operations occur in a latent space that not only depends on the dimension used, but also on the cost function used for optimization, it is difficult to intuitively think about and understand what is happening.

By contrast, implementations of the disclosure employ a simultaneous embedding technique that embeds users and entities in a vector space such that the users are positioned proximate to their preferred entities. As noted, this is accomplished by using a technique similar to Doc2Vec, but replacing documents with users, and words of a document with entities preferred by a user. The simultaneous embedding into the vector space enables an intuitive understanding of various types of relationships, including user-to-entity relationships, user-to-user relationships, and entity-to-entity relationships.

For purposes of understanding in the present disclosure, it is useful to describe the Word2Vec and Doc2Vec models which have become widely used in recent years for distributed representation of words and documents. Word2Vec (e.g., see Mikolov, T.; Sutskever, I.; Chen, K.; Corrado, G. S.; and Dean, J., 2013, "Distributed representations of words and phrases and their compositionality," *Advances in Neural Information Processing Systems* 26. 3111-3119) and Doc2Vec (a.k.a. Paragraph Vector) (e.g., see Le, Q. V., and Mikolov, T., 2014, "Distributed representations of sentences and documents," *ICML*, volume 14, 1188-1196) aim at learning low-dimensional feature vectors (i.e., embeddings) for words and documents from a large corpus in an unsupervised manner, such that similarity between words (or documents) can be reflected by some distance metric determined from their embeddings. The general assumption behind Word2Vec and Doc2Vec is that more frequent co-occurrence of two words inside a small neighborhood of a document should imply higher semantic similarity between them.

Let V be the size of the vocabulary (i.e., set of unique words), N be the number of documents in the training set, and K be the dimension of the vector space of embedding. The vocabulary is denoted as $W=\{w_1, \ldots, w_V\}$, and the set of documents as $\mathcal{D}=\{d_1, \ldots, d_N\}$. Each document $d \in \mathcal{D}$ is basically a sequence of $n_d$ words represented by $(w_1^d, w_2^d, \ldots, w_{n_d}^d)$. Here the subscript d of n suggests that the number of words is different from document to document. For convenience, the shorthand $w_i^d : w_j^d$, $i \leq j$, is used to denote the subsequence of words $w_i^d, w_{i+1}^d, \ldots, w_{j-1}^d, w_j^d$ in document d. Correspondingly, $W=[w_1, \ldots, w_V] \in \mathbb{R}^{K \times V}$ denotes the matrix for word embeddings, and $D=[d_1, \ldots, d_N] \in \mathbb{R}^{K \times N}$ denotes the matrix for document embeddings. The symbol $d_i$ can in some instances be used interchangeably with the embedding vector $d_i$ to refer to the i-th document, and $d_d$ can be used to denote the vector representation of document d. Similar conventions apply to word embeddings. $\sigma(\bullet)$ denotes the sigmoid function, i.e., $\sigma(a)=1/(1+\exp(-a))$.

Word2Vec is an unsupervised model for learning embedding of words. Essentially, Word2Vec embeds all words in the training corpus into a low-dimensional vector space, so that the semantic similarities between words can be reflected by some distance metric (e.g., cosine distance) defined based on their vector representations. Training the Word2Vec model entails minimizing the loss function associated with a certain classifier with respect to both feature vectors (i.e., word embeddings) and classifier parameters, such that the nearby words are able to predict each other. For example, in a continuous bag-of-words (CBOW) framework, Word2Vec specifically minimizes the following average negative log probability:

$$\sum_{d \in D} \sum_{i=1}^{n_d} -\log p(w_i^d \mid w_{i-c}^d : w_{i-1}^d, w_{i+1}^d : w_{i+c}^d),$$

where c is the size of the context window inside which words are defined as "nearby." To ensure the conditional probability above is legitimate, it is usually necessary to evaluate a partition function, which may lead to a computationally prohibitive model when the vocabulary is large. One way to bypass such an issue is to use hierarchical softmax (HS), which factorizes the conditional probability into products of some simple terms. Hierarchical softmax relies on the construction of a binary tree $\mathcal{B}$ with V leaf nodes, each of which corresponds to a particular word in the vocabulary $\mathcal{W}$. HS is parameterized by a matrix $H \in \mathbb{R}^{K \times (V-1)}$, whose columns are respectively mapped to a unique nonleaf node of B. Additionally, we define Path(w)={(i,j)∈B|edge (i,j) is on the path from root to word w}. Then the negative log probability is given as $$-\log p(w_i^d \mid w_{i-c}^d : w_{i-1}^d, w_{i+1}^d : w_{i+c}^d) = -\log \prod_{(u,v) \in Path(w_i^d)} \sigma(\text{child}(v) \cdot \langle g_i^d, h_v \rangle) =$$

$$- \sum_{(u,v) \in Path(w_i^d)} \log \sigma(\text{child}(v) \cdot \langle g_i^d, h_v \rangle), g_i^d = \sum_{\substack{-c \le j \le c \\ j \ne 0}} w_{i+j}^d,$$

where child (u,v) is equal to 1 if v is the left child of u and 0 otherwise. In a CBOW Word2Vec framework, $g_i^d$ is basically the input feature for an HS classifier corresponding to a projection layer, which essentially summarizes the feature vectors of context words surrounding $w_i^d$, and other options like averaging of $w_{i+j}^d$ can also be applied. This Word2Vec model can be directly extended to a distributed memory (DM) Doc2Vec model by conditioning the probability of $w_i^d$ on d as well as $w_{i-c}^d, \ldots, w_{i+c}^d$, which yields $$-\log p(w_i^d \mid w_{i-c}^d : w_{i-1}^d, w_{i+1}^d : w_{i+c}^d, d) =$$

$$- \sum_{(u,v) \in Path(w_i^d)} \log \sigma(\text{child}(v) \cdot \langle \tilde{g}_i^d, h_v \rangle), \tilde{g}_i^d = d_d + \sum_{\substack{-c \le j \le c \\ j \ne 0}} w_{i+j}^d.$$

In the DM Doc2Vec model as shown, instead of optimizing some rigorously defined probability function, both Word2Vec and Doc2Vec can be trained using other objectives, e.g., negative sampling (NEG).

As noted, implementations of the present disclosure are drawn to generation of user profiles using an approach similar to Doc2Vec, but in which the documents (or document identifiers) are replaced with users (or user identifiers), and the words of a given document are replaced with entities associated with a given user. Given the training data, the goal is to learn a model that, given a user and his entities inside a context window of entities surrounding a middle (target) entity, predicts the middle entity. That is, the embedding should maximize the conditional probability of a target entity based upon the context entities and the user identity. The optimization problem can be formally stated as follows:

$$\max \sum_{i=1}^{U} \sum_{t=k}^{t=T_i-k} \log p(e(t) \mid e(t-k), \ldots, e(t+k), i)$$

where U is the total number of users, $T_i$ is the number of entities in a user's training data point, and i is the user index. In some implementations, this probability is modeled via a one-hidden layer Neural Network and training can be done via back propagation. In some implementations, if the number of entities is very large, then negative sampling can be applied to reduce the computational requirement.

Figure 2:
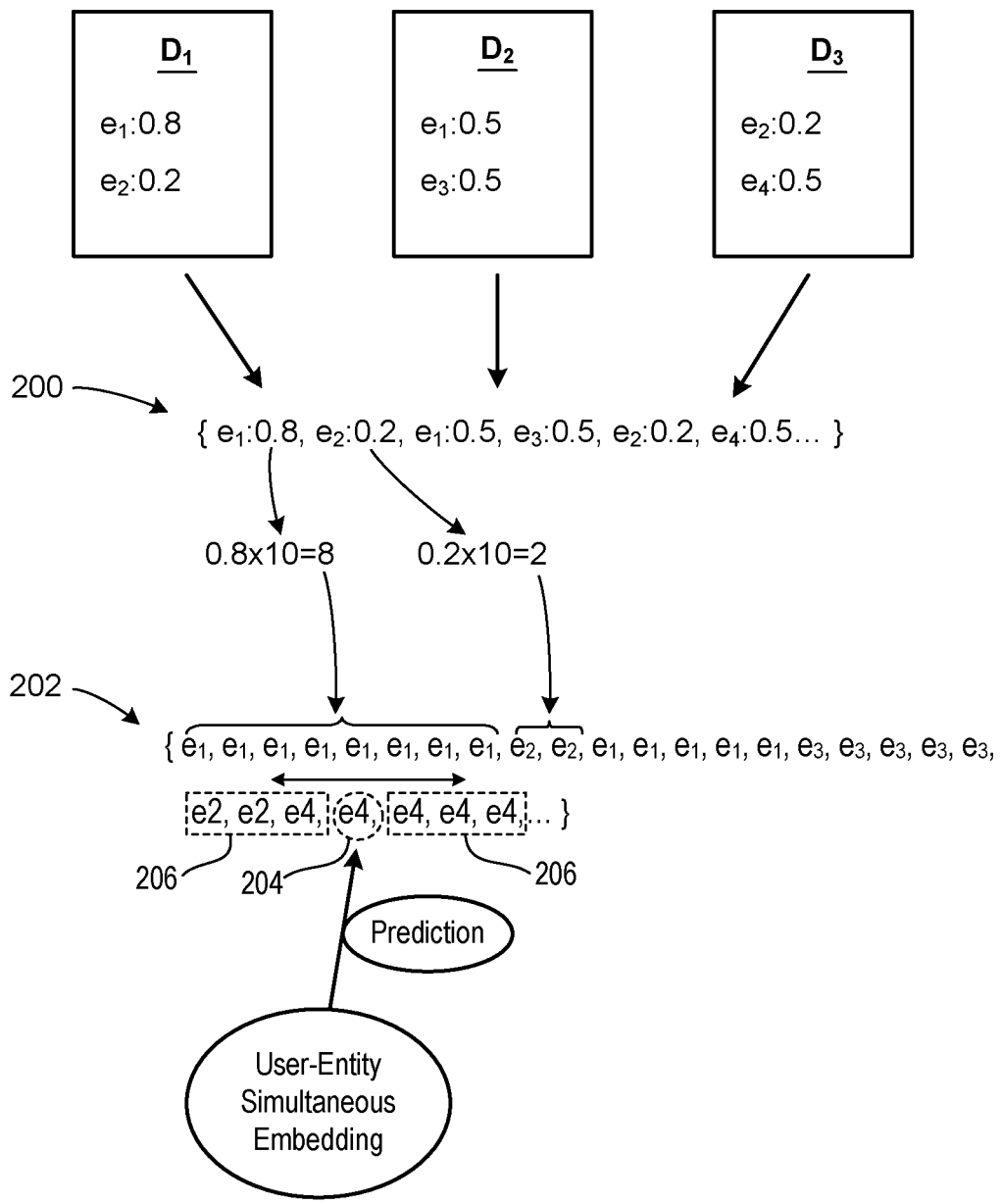
FIG. 2 conceptually illustrates the generation of training data for a given user, in accordance with implementations of the disclosure.

FIG. 2 conceptually illustrates the generation of training data for a given user, in accordance with implementations of the disclosure. In the illustrated implementation, specific numbers and ranges are used for purposes of describing an example. It will be appreciated that in other implementations, any other specific numbers or ranges may be used that provide for generation of training data in accordance with the techniques described.

With continued reference to FIG. 2, documents $D_1$, $D_2$, and $D_3$ are content items (e.g. article, post, video, image, etc.) in which a given user $U_1$ has demonstrated interest. Each document is associated with particular entities, with the strength of the association being represented by an "aboutness" score/value that ranges from 0 to 1 in increments of 0.1 in some implementations. In other implementations, any other range or incremental value may be applied. In the illustrated example, the document $D_1$ has a score of 0.8 for an entity $e_1$, and a score of 0.2 for an entity $e_2$. The document $D_2$ has a score of 0.5 for the entity $e_1$, and a score of 0.5 for the entity $e_3$. The document $D_3$ has a score of 0.2 for the entity $e_2$ and a score of 0.5 for the entity $e_4$. A higher score indicates greater strength of association, i.e. greater extent that a given document is "about" a given entity.

It will be appreciated that an entity can be any term or phrase that is descriptive of a document, or which a document can be determined to be about. From the standpoint of the goal of generating user profiles, the entities can include any term or phrase that is used as a feature of the user profile, as further described below. In some implementations, entities can include any Wikipedia entity, which is any item having a Wikipedia entry. In view of the foregoing, entities can be any encyclopedic topic/subject, and may include persons, places, things, subjects, topics, etc.

The entity score of a document can be further understood as an indicator of user interest in the entity when a user engages with the document. That is, the higher the entity score, then the more likely that user engagement with the document indicates user interest in the corresponding entity. It will be appreciated that user engagement can be indicated by detection of various interactions with a document, such as accessing a document, selecting/clicking on a preview to gain such access, posting a comment in response, endorsing (e.g. indicating thumbs-up or liking) on a social network, sharing to a social network, detecting time spent reading or viewing, selecting/clicking a link in a document, etc.

With continued reference to FIG. 2, a user A has interacted with each of the documents $D_1$, $D_2$, and $D_3$, which indicates that the user is interested in the entities which are associated with each of the documents. In order to form training data based on these interactions, for each interaction with a document, the entity scores which are associated with that document are converted to repeated sequences of the corresponding entities, and concatenated together. The number of times that a given entity is repeated is correlated to the entity score (e.g. the higher the entity score, the greater number of times the entity is repeated in the sequence). The sequences for all documents which the user has interacted with over time are concatenated together to form the training data set for the given user.

Consideration of the example shown at FIG. 2 will serve to illustrate the foregoing method for generating training data from user interactions with documents. As noted, the user has interacted with each of the documents $D_1$, $D_2$, and $D_3$. Combining the entity scores from each of these documents yields a set 200 of entity scores. In some implementations, the entity scores in the set 200 can be temporally ordered according to when the user interacted with each document.

The entity scores in the set 200 are then converted to repeated sequences of the corresponding entities, with the number of repetitions being determined by the entity score of a given entity. In the illustrated implementation, the entity scores are multiplied by 10 to yield an integer value of 0 to 10, and the integer value define the number of times that its corresponding entity is repeated. Thus, the entity score $e_1=0.8$ from document $D_1$ is converted to a sequence of 8 recitations of $e_1$; the entity score $e_2=0.2$ from document $D_1$ is converted to a sequence of 2 recitations of $e_2$. The entity score $e_1=0.5$ from document $D_2$ is converted to a sequence of 5 recitations of $e_1$; the entity score $e_3$ from document $D_2$ is converted to a sequence of 5 recitations of $e_3$. The entity score $e2=0.2$ from document $D_3$ is converted to a sequence of 2 recitations of $e_2$; the entity score $e_4$ from document $D_3$ is converted to a sequence of 5 recitations of $e_4$. As shown, the recitations of the entities are concatenated to form the training data set 202.

An embedding technique similar to Doc2Vec is applied, but replacing documents with user identifiers, and replacing words of a document with a sequence of entities as defined by the training data set 202 of the user. Thus, in the illustrated implementation, the embedding is configured to predict (or maximize the conditional probability of) a target entity 204 in the training data 202 based on contextual entities 206 as well as the user identifier.

Figure 3:
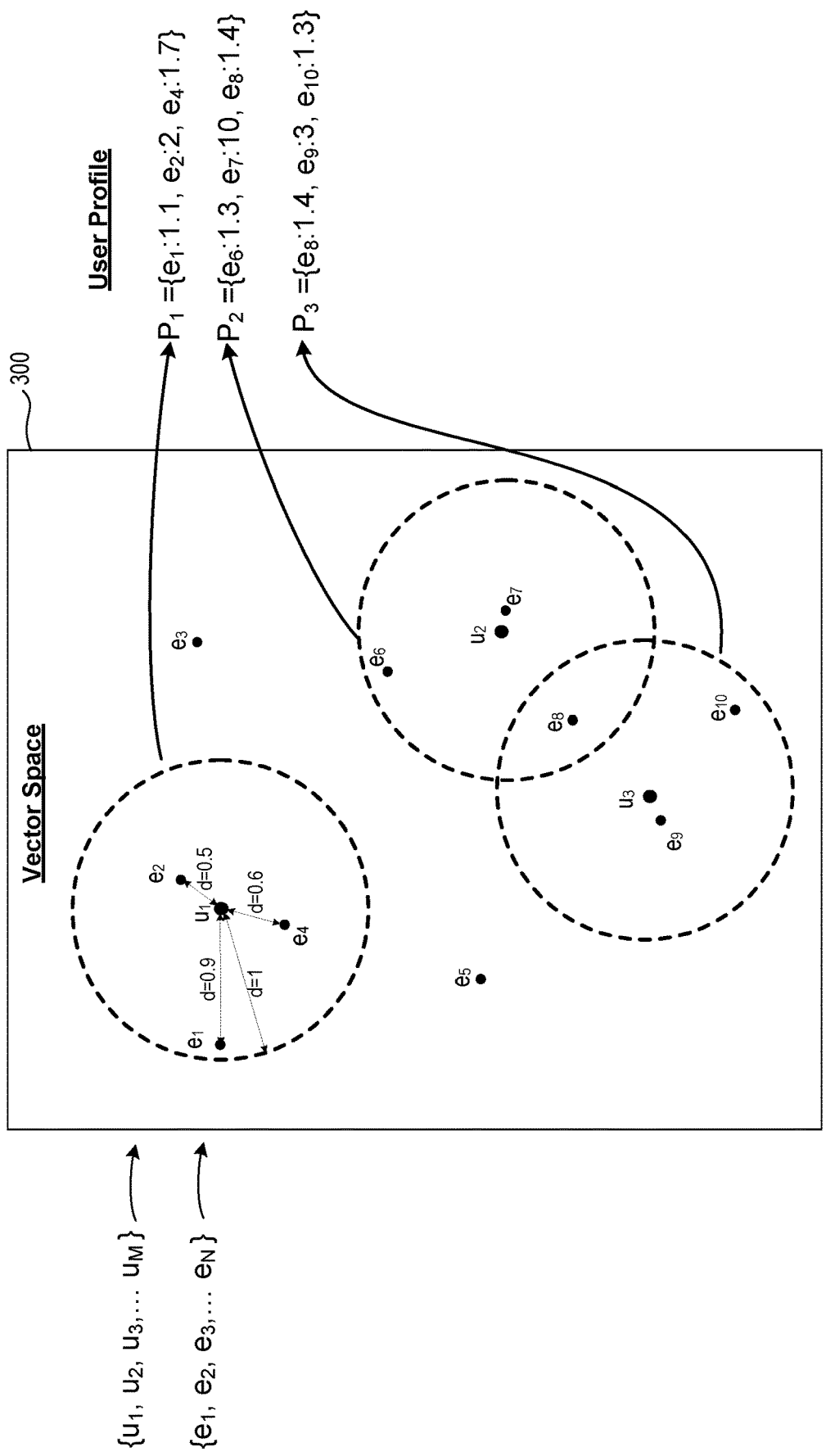
FIG. 3 conceptually illustrates generation of a vector space in which users and entities are embedded, and generation of user profiles based on distance in the vector space, in accordance with implementations of the disclosure.

FIG. 3 conceptually illustrates generation of a vector space in which users and entities are embedded, and generation of user profiles based on distance in the vector space, in accordance with implementations of the disclosure. The users and the entities are embedded in accordance with the techniques described above, wherein users and their corresponding entities are given vector representations so as to locate a given user in proximity to his/her preferred entities (entities in which the user has demonstrated interest based on tracked/detected interactions).

By embedding users and entities (their interests) in this manner across all users and entities, then users will not only be located in the vector space in proximity to their own interests, but also to those interests of other users with which they share interests. Thus, a user profile for a given user can be constructed based on distance from the given user that will capture not only the entities for which the given user has indicated an interest, but also entities that the given user is likely to be interested in. By constructing a user profile in this manner, collaborative personalization can be provided.

In the illustrated implementation, the users and entities are embedded in the vector space 300, including users $u_1$, $u_2$, and $u_3$, and entities $e_1$ to $e_{10}$, for purposes of illustration. In some implementations, to generate a user profile for a given user, a k-nearest neighbor search in the vector space 300 is performed to find k number of nearest entities to the given user, as determined based on Euclidean distance in the vector space 300. In other implementations, a user profile may be generated by finding all entities within a predefined distance of the given user in the vector space 300. A similarity score for a given entity can be determined based on the inverse of the distance of the entity from the given user, as intuitively, the strength of the association or interest of the user in a given entity is inversely related to the distance between the user and the entity in the vector space. That is, as distance decreases, user interest in the entity increases.

With continued reference to FIG. 3, following a k-nearest neighbor strategy where k=3, the user $u_1$ is shown to be nearest to entities $e_2$, $e_4$, and $e_1$, at distances of 0.5, 0.6, and 0.9, respectively. Using the inverse of these distances as the similarity scores for the various entities, then a user profile $P_1$ for the user $u_1$ can be determined using the similarity scores, which are 2, 1.7, and 1.1, respectively, for the entities $e_2$, $e_4$, and $e_1$. User profiles for the users $u_2$ and $u_3$ can be generated in a similar manner, as shown in the illustrated implementation.

It will be appreciated that the value of k for the k-nearest neighbor search can be set to include a greater or lesser number of entities as desired depending upon how expansive a user profile is desired.

In other implementations, a user profile can be generated by selecting entities that are located within a predefined distance of the user in the vector space 300. By way of example, in the illustrated implementation, entities within a predefined distance of 1.0 of the user $u_1$ would include entities $e_1$, $e_2$, and $e_4$. Similarity scores could be calculated based on the inverse of the distances, and used to assign scores for each of the entities that reflect the relative interest of the user in each of the entities included in the user profile.

In some implementations, the concepts of a k-nearest neighbor search and a predefined distance threshold can be combined, wherein k-nearest neighbor entities are included, except that entities beyond a predefined distance threshold are not included.

Figure 4:
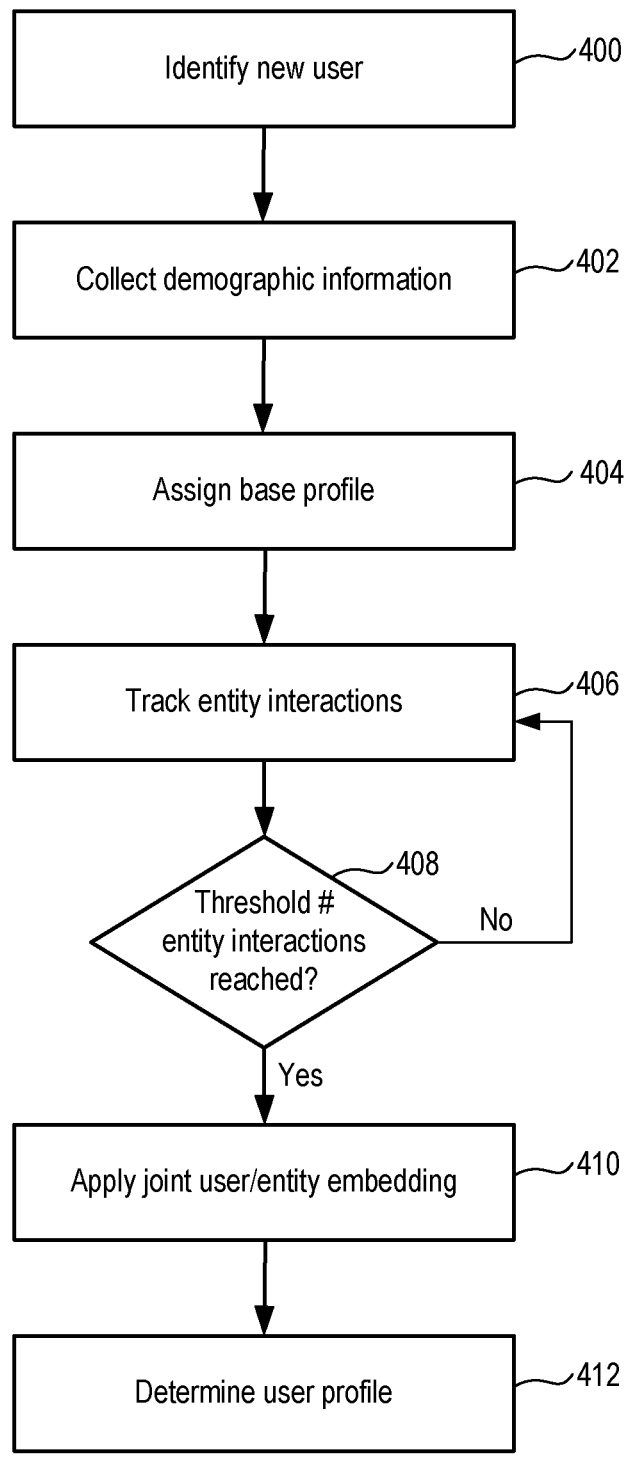
FIG. 4 illustrates a method for determining a user profile based on user interactions with content, in accordance with implementations of the disclosure.

FIG. 4 illustrates a method for determining a user profile based on user interactions with content, in accordance with implementations of the disclosure. At method operation 400, a new user is identified. At method operation 402, demographic information about the new user is determined (e.g. age, gender, location/address, etc.). Such demographic information can be collected from the user (e.g. through user-submitted survey information) and/or inferred (e.g. based on user ip address). At method operation 404, a base profile is assigned to the new user based on their demographic information.

It will be appreciated that the base profile is not determined based on embedding of users and entities as described above. This is because at this stage, there are not sufficient recorded interactions with entities from which to determine the embedding of the new user in the vector space. However, content is recommended and provided on the basis of the base profile, and at method operation 406, entity interactions by the new user with the provided content are tracked. At method operation 408, it is determined whether a threshold number of entity interactions has been reached. If not, then the method continues to recommend content using the base profile, while continuing to track the entity interactions.

An entity interaction is defined as an interaction with a content item/document that is associated with a given entity. Before the new user's interaction data can be added to the training data, a sufficient number of interactions need to be recorded. Otherwise, the interactions of the user would not accurately reflect the user's preferences, and this would contaminate the training data, as it would affect the embedding of the entities. Broadly speaking, if the vector representation of the users/entities is a n-dimensional vector, then a number of entity interactions approximately on the order of n is required before embedding. For example, the system may require three times the dimensionality of the vector space. Thus by way of example, if the vector space is a 300 dimensional vector space, then 900 entity interactions will be required. If each document has on average three entities associated therewith, then approximately 300 document interactions will be required to reach 900 entity interactions, as each document interaction results in interactions being recorded for each of the document's associated entities.

During such time when the base profile is being used, it will be appreciated that the base profile for a given user can be adjusted based on the user's interaction with provided content. This can occur using techniques similar to that described with reference to FIG. 1, wherein entity-based features of the base profile are adjusted up or down based on positive or negative interactions with content having certain features (e.g. clicking, skipping, etc.).

When sufficient entity interactions have been obtained, then at operation 410, the joint user-entity embedding technique described above is applied. That is, the training data for the new user is determined in accordance with the technique described above, and along with the training data of other users, the joint embedding of the users and the entities can be carried out, including the embedding for the new user. Then at operation 412, a user profile for the new user can be determined in accordance with the above, e.g. using a k-nearest neighbor search to identify nearest entities and determining similarity scores for the nearest entities.

This user profile can then subsequently be used to recommend content to the new user, and may encompass entities beyond those that the new user has already interacted with, as the user profile is now collaboratively determined.

Figure 5:
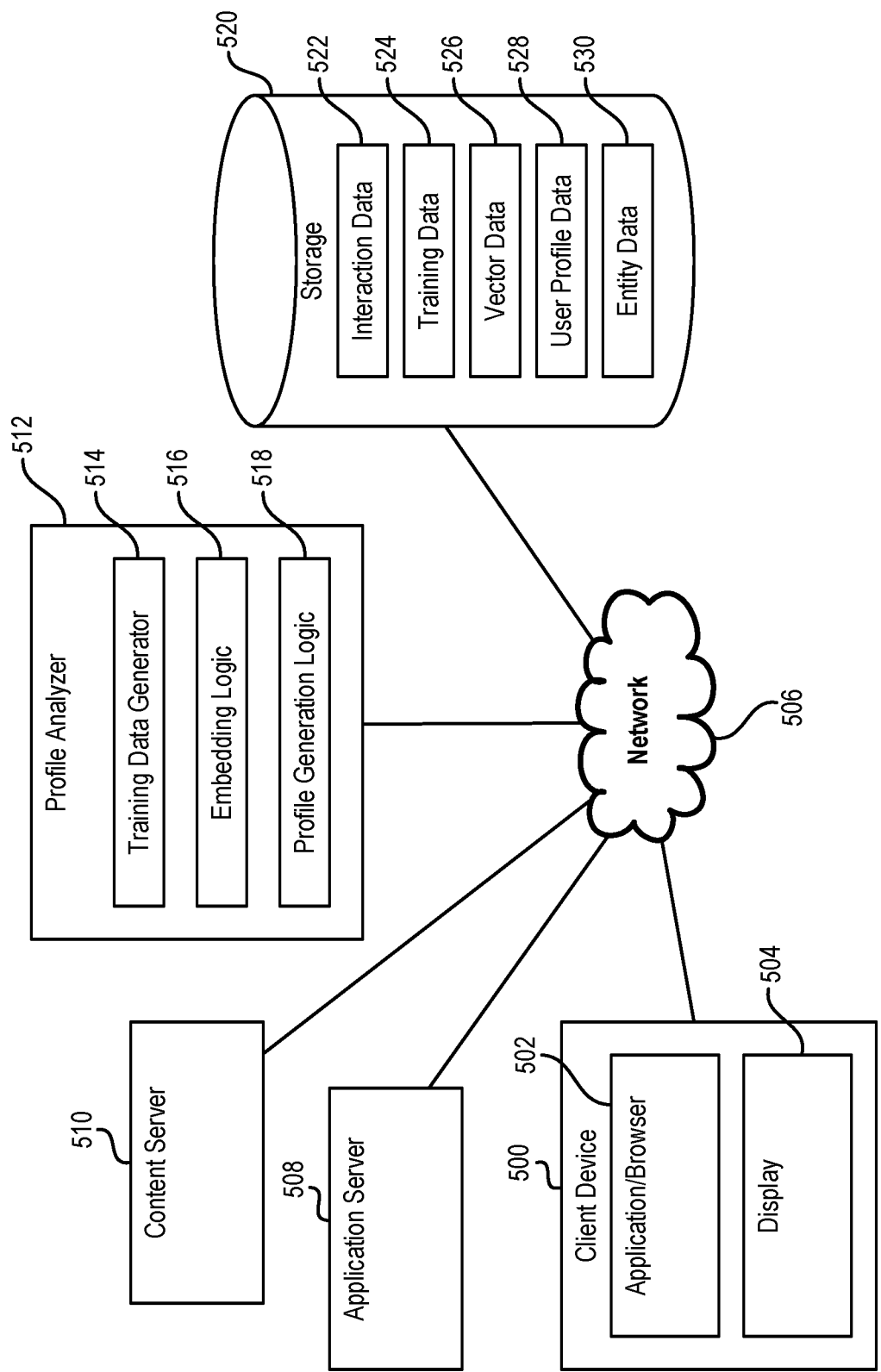
FIG. 5 illustrates a system for providing content to users based on user profiles, in accordance with implementations of the disclosure.

FIG. 5 illustrates a system for providing content to users based on user profiles, in accordance with implementations of the disclosure. Broadly speaking, the system can be configured to perform any of the methods for generating and using user profiles to provide content over a network described in accordance with implementations of the present disclosure. A client device 500 is operated by a user to access a content site or platform, which in various implementations may be a social content/networking/sharing site, an e-commerce site, a news site, forum site, blogging site, etc. The client device 500 executes an application 502 (which in some implementations, may be a browser application or a web application) that is configured to render to the display 504 of the client device 500 an interface for interacting with the content site. The application 502 may communicate over a network 506 (e.g. the Internet) with an application server 508 to obtain data so that the user may access the content site, including accessing specific content, topics/categories, a personalized feed, etc.

It will be appreciated that in some implementations, content can be obtained from a separate content server 510 for rendering in the context of the interface that is rendered on the client device 500. For example, a preview of a piece of content (e.g. an article from a $3^{rd}$ party news source) may be provided, and accessing the article may redirect to obtain the full content from the content server 510 (e.g. the $3^{rd}$ party news source's content server).

A profile analyzer 512 is configured to determine user profiles in accordance with the methods disclosed herein. The profile analyzer 512 includes training data generator 514 that is configured to process user interactions with content, stored as interaction data 522 in a storage 520, to generate training data 524 in accordance with the methods described above. As noted, the training data 524 includes, for each unique user, a sequence of entities generated from the user's historical interactions with content.

The profile analyzer 512 further includes embedding logic 516 that is configured to process training data 524 to embed the users and the entities in a vector space as has been described above. The resulting vector representations of the users and the entities are stored as vector data 526. The profile analyzer 512 further includes profile generation logic 518 that is configured to generate user profiles for the users by, for each user, determining a set of nearest entities in the vector space to the user. The profile generation logic 518 assigns such entities to the user to define the user profile, and may further associate entity scores that are determined from the similarity of the entity to the user, as determined from the distance of the entities from the user. The user profiles thus defined can be stored as user profile data 528.

It will be appreciated that the user profile data 528, can be used by the application server 508 or content server 510 to recommend content in response to a user request, such as a search query or a request to view a given webpage. In some implementations, this may entail ranking content or results based on a given user's user profile to determine the order in which such content will be presented to the user.

The system may store entity data 530 that defines the available entities for use for purposes of determining user profiles. In some implementations, the system periodically obtains entity data from an entity source (e.g. crawls the entity source). One example of an entity source is Wikipedia, wherein items having Wikipedia entries are used as entities.

Figure 6:
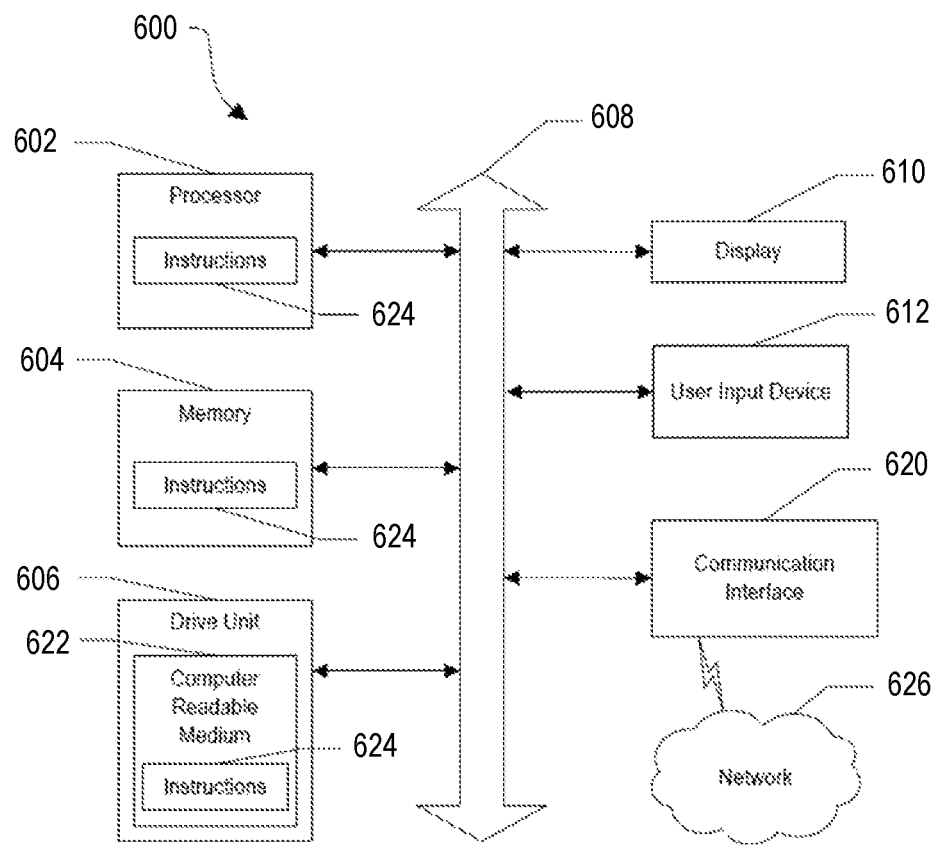
FIG. 6 illustrates an implementation of a general computer system, in accordance with an implementation of the disclosure.

FIG. 6 illustrates an implementation of a general computer system designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random access memory for the processor 602. In alternative implementations, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the programmed processor 602 executing the instructions stored in the memory 604. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 600 may further include a display unit 610, such as a liquid crystal display (LCD), an organic light emitting diode (OLED), a flat panel display, a solid state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 606.

Additionally or alternatively, the computer system 600 may include an input device 612 configured to allow a user to interact with any of the components of system 600. The input device 612 may be a number pad, a keyboard, or a cursor control device, such as a mouse, or a joystick, touch screen display, remote control or any other device operative to interact with the computer system 600.

The computer system 600 may also or alternatively include a disk or optical drive unit 606. The disk drive unit 606 may include a computer-readable medium 622 in which one or more sets of instructions 624, e.g. software, can be embedded. Further, the instructions 624 may embody one or more of the methods or logic as described herein. The instructions 624 may reside completely or partially within the memory 604 and/or within the processor 602 during execution by the computer system 600. The memory 604 and the processor 602 also may include computer-readable media as discussed above.

In some systems, a computer-readable medium 622 includes instructions 624 or receives and executes instructions 624 responsive to a propagated signal so that a device connected to a network 626 can communicate voice, video, audio, images or any other data over the network 626. Further, the instructions 624 may be transmitted or received over the network 626 via a communication port or interface 620, and/or using a bus 608. The communication port or interface 620 may be a part of the processor 602 or may be a separate component. The communication port 620 may be created in software or may be a physical connection in hardware. The communication port 620 may be configured to connect with a network 626, external media, the display 610, or any other components in system 600, or combinations thereof. The connection with the network 626 may be a physical connection, such as a wired Ethernet connection or may be established wirelessly as discussed below. Likewise, the additional connections with other components of the system 600 may be physical connections or may be established wirelessly. The network 626 may alternatively be directly connected to the bus 608.

While the computer-readable medium 622 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The computer-readable medium 622 may be non-transitory, and may be tangible.

The computer-readable medium 622 can include a solid-state memory such as a memory card or other package that houses one or more non-volatile read-only memories. The computer-readable medium 622 can be a random access memory or other volatile re-writable memory. Additionally or alternatively, the computer-readable medium 622 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 600 may be connected to one or more networks 626. The network 626 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 626 may include wide area networks (WAN), such as the Internet, local area networks (LAN), campus area networks, metropolitan area networks, a direct connection such as through a Universal Serial Bus (USB) port, or any other networks that may allow for data communication. The network 626 may be configured to couple one computing device to another computing device to enable communication of data between the devices. The network 626 may generally be enabled to employ any form of machine-readable media for communicating information from one device to another. The network 626 may include communication methods by which information may travel between computing devices. The network 626 may be divided into sub-networks. The sub-networks may allow access to all of the other components connected thereto or the sub-networks may restrict access between the components. The network 626 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method implemented by at least one computer, comprising:
    processing interactions by a plurality of users with a plurality of content items, the plurality of content items being provided over a network in response to user requests received over the network, wherein each content item is associated with one or more entities;
    obtaining entity data from an entity source comprising an encyclopedia;
    for a user of the plurality of users:
        determining, at a first time, that there are not a threshold number of entity interactions with entities to determine an embedding of the user;
        responsive to determining that there are not the threshold number of entity interactions with entities to determine the embedding of the user:
            assigning a base profile to the user based upon demographic information of the user; and
            recommending content to the user based upon the base profile;
        determining, at a second time after the first time, that the threshold number of entity interactions has been reached for the user; and
        responsive to determining that the threshold number of entity interactions has been reached for the user:
            determining, based upon the entity data obtained from the entity source, a user entity set that includes first entities associated with content items with which the user interacted and second entities associated with content items with which one or more users similar to the user interacted, wherein the user entity set comprises one or more entities determined based upon encyclopedia entries of the encyclopedia; and
            embedding the user and entities associated with the plurality of content items in a vector space, wherein the embedding is configured to place the user, the first entities of the user entity set, and the second entities of the user entity set, in proximity to each other in the vector space, wherein the embedding is configured to predict a target entity in the user entity set using context entities in the user entity set;
    adjusting a distance-based scope for generation of a user profile,
        wherein the distance-based scope corresponds to a first level of interest of the user in one or more third entities, of the entities associated with the plurality of content items, within the distance-based scope,
        wherein a second distance-based scope that is greater than the distance-based scope corresponds to a second level of interest of the user in one or more fourth entities, of the entities associated with the plurality of content items, within the second distance-based scope,
        wherein the one or more third entities within the distance-based scope are also within the second distance-based scope but the one or more fourth entities within the second distance-based scope are not within the distance-based scope,
wherein the second level of interest of the user in the one or more fourth entities within the second distance-based scope is lower than the first level of interest of the user in the one or more third entities within the distance-based scope;
performing a proximity search in the vector space to identify a set of nearest entities to the user in the vector space that are both (i) k-nearest neighbors of the user and (ii) within the distance-based scope for generation of the user profile, wherein at least one entity that is a k-nearest neighbor of the user but is beyond the distance-based scope is not included in the set of nearest entities to the user; and
generating the user profile using the set of nearest entities to the user after determining that the threshold number of entity interactions has been reached for the user.

2. The method of claim 1, comprising:
in response to a request defined from a social media access request, determining recommended content items based on the user profile.

3. The method of claim 1, wherein the embedding is configured to minimize a loss function.

4. The method of claim 3, wherein the loss function includes a component configured to approximate a conditional probability of the target entity based upon the context entities.

5. The method of claim 1, comprising:
for a second user of the plurality of users, determining a second user entity set that includes fifth entities associated with content items with which the second user interacted and sixth entities associated with content items with which one or more users similar to the second user interacted, wherein the embedding is configured to place the second user, the fifth entities of the second user entity set, and the sixth entities of the second user entity set, in proximity to each other in the vector space;
determining a third distance-based scope for generation of a second user profile associated with the second user;
performing a second proximity search in the vector space to identify a second set of nearest entities to the second user in the vector space that are within the second distance-based scope for generation of the second user profile; and
generating the second user profile using the second set of nearest entities to the second user.

6. The method of claim 1, comprising:
receiving, over the network, a request to access content items by the user.

7. The method of claim 6, comprising:
in response to the request, determining recommended content items based upon the user profile.

8. The method of claim 7, comprising:
providing, over the network to the user, access to the recommended content items.

9. A computer readable medium having program instructions embodied thereon, the program instructions being configured, when executed by a computing device, to cause the computing device to perform operations comprising:
processing interactions by a plurality of users with a plurality of content items, the plurality of content items being provided over a network in response to user requests received over the network, wherein each content item is associated with one or more entities;
obtaining entity data from an entity source comprising an encyclopedia;
for a user of the plurality of users:
determining, at a first time, that there are not a threshold number of entity interactions with entities to determine an embedding of the user;
responsive to determining that there are not the threshold number of entity interactions with entities to determine the embedding of the user:
assigning a base profile to the user based upon demographic information of the user; and
recommending content to the user based upon the base profile;
determining, at a second time after the first time, that the threshold number of entity interactions has been reached for the user; and
responsive to determining that the threshold number of entity interactions has been reached for the user:
determining, based upon the entity data obtained from the entity source, a user entity set that includes first entities associated with content items with which the user interacted and second entities associated with content items with which one or more users similar to the user interacted, wherein the user entity set comprises one or more entities determined based upon encyclopedia entries of the encyclopedia; and
embedding the user and entities associated with the plurality of content items in a vector space, wherein the embedding is configured to place the user, the first entities of the user entity set, and the second entities of the user entity set, in proximity to each other in the vector space, wherein the embedding is configured to predict a target entity in the user entity set using context entities in the user entity set;
adjusting a distance-based scope for generation of a user profile,
wherein the distance-based scope corresponds to a first level of interest of the user in one or more third entities, of the entities associated with the plurality of content items, within the distance-based scope,
wherein a second distance-based scope that is greater than the distance-based scope corresponds to a second level of interest of the user in one or more fourth entities, of the entities associated with the plurality of content items, within the second distance-based scope,
wherein the one or more third entities within the distance-based scope are also within the second distance-based scope but the one or more fourth entities within the second distance-based scope are not within the distance-based scope,
wherein the second level of interest of the user in the one or more fourth entities within the second distance-based scope is lower than the first level of interest of the user in the one or more third entities within the distance-based scope;
performing a proximity search in the vector space to identify a set of nearest entities to the user in the vector space that are both (i) k-nearest neighbors of the user and (ii) within the distance-based scope for generation of the user profile, wherein at least one entity that is a k-nearest neighbor of the user but is beyond the distance-based scope is not included in the set of nearest entities to the user; and generating the user profile using the set of nearest entities to the user after determining that the threshold number of entity interactions has been reached for the user.

10. The computer readable medium of claim 9, in response to a request defined from a product search, determining recommended content items based on the user profile.

11. The computer readable medium of claim 9, wherein the embedding is configured to minimize a loss function.

12. The computer readable medium of claim 11, wherein the loss function includes a component configured to approximate a conditional probability of the target entity based upon the context entities.

13. The computer readable medium of claim 9, wherein performing the proximity search includes performing a k-nearest neighbor search.

14. The computer readable medium of claim 9, wherein the operations include:
receiving, over the network, a request to access content items by the user;
in response to the request, determining recommended content items based on the user profile; and
providing, over the network to the user, access to the recommended content items.

15. The computer readable medium of claim 14, wherein the request is defined from at least one of a web page request, or a search query.

16. The computer readable medium of claim 9, wherein the content items include at least one of articles, social media posts, videos, images, or audio.

17. A computer, comprising:
a processor; and
memory comprising processor-executable instructions that when executed by the processor cause performance of operations, the operations comprising:
processing interactions by a plurality of users with a plurality of content items, the plurality of content items being provided over a network in response to user requests received over the network, wherein each content item is associated with one or more entities;
obtaining entity data from an entity source comprising an encyclopedia;
for a user of the plurality of users:
determining, at a first time, that there are not a threshold number of entity interactions with entities to determine an embedding of the user;
responsive to determining that there are not the threshold number of entity interactions with entities to determine the embedding of the user:
assigning a base profile to the user based on demographic information of the user; and
recommending content to the user based upon the base profile;
determining, at a second time after the first time, that the threshold number of entity interactions has been reached for the user; and
responsive to determining that the threshold number of entity interactions has been reached for the user:
determining, based upon the entity data obtained from the entity source, a user entity set that includes first entities associated with content items with which the user interacted and second entities associated with content items with which one or more users similar to the user interacted, wherein the determining the user entity set comprises determining that a first entity is associated with a first content item with which the user interacted and including the first entity in the user entity set based on a first strength of association score of the first content item for the first entity, wherein the user entity set comprises one or more entities determined based upon encyclopedia entries of the encyclopedia; and
embedding the user and entities associated with the plurality of content items in a vector space, wherein the embedding is configured to place the user, the first entities of the user entity set, and the second entities of the user entity set, in proximity to each other in the vector space, wherein the embedding is configured to predict a target entity in the user entity set using context entities in the user entity set;
adjusting a scope for generation of a user profile, wherein the scope corresponds to a first level of interest of the user in one or more third entities, of the entities associated with the plurality of content items, within the scope,
wherein a second scope that is different than the scope corresponds to a second level of interest of the user in one or more fourth entities, of the entities associated with the plurality of content items, within the second scope,
wherein the one or more third entities within the scope are also within the second scope but the one or more fourth entities within the second scope are not within the scope,
wherein the second level of interest of the user in the one or more fourth entities within the second scope is different than the first level of interest of the user in the one or more third entities within the scope;
performing a proximity search in the vector space to identify a set of nearest entities to the user in the vector space that are both (i) k-nearest neighbors of the user and (ii) within the scope for generation of the user profile, wherein at least one entity that is a k-nearest neighbor of the user but is beyond the scope is not included in the set of nearest entities to the user; and
generating the user profile using the set of nearest entities to the user after determining that the threshold number of entity interactions has been reached for the user.

18. The computer of claim 17, the operations comprising:
receiving, over the network, a request to access content items by the user.

19. The computer of claim 18, the operations comprising:
in response to the request, determining recommended content items based upon the user profile.

20. The computer of claim 19, the operations comprising:
providing, over the network to the user, access to the recommended content items.

* * * * *